(No Model.)

G. N. PEARSON.
THILL COUPLING.

No. 523,129. Patented July 17, 1894.

WITNESSES
J. H. Smith
G. W. C. Davison

INVENTOR
George N. Pearson

UNITED STATES PATENT OFFICE.

GEORGE N. PEARSON, OF HANTSPORT, CANADA.

THILL-COUPLING.

SPECIFICATION forming part of Letters Patent No. 523,129, dated July 17, 1894.

Application filed December 2, 1893. Serial No. 492,632. (No model.)

*To all whom it may concern:*

Be it known that I, GEORGE N. PEARSON, a subject of Victoria, Queen of Great Britain, residing at Hantsport, county of Hants, Nova Scotia, Canada, have invented a new and useful Improvement in Thill-Couplings, of which the following is a full, clear, and exact description, reference being had to the accompanying drawings, forming a part of this specification, in explaining its nature.

The invention relates to a thill coupling, or means for attaching shafts to an axle, whereby a strong union is secured and noise or rattle consequent from the present mode of attachment lessened or done away with and increased wearing properties obtained.

To carry my invention into effect, the carriage or wagon axle is provided with a collar or shoulder at a suitable distance from the hub or wheel bearing, and each end of the shaft outside of this shoulder or collar has a threaded section for receiving a holding nut, this threaded section being at each end of the axle between the collar or shoulder and the wheel or hub bearing.

The thills have at their inner ends the couplings which are securely bolted to them, and which are formed to provide a hole of the size of the axle next the shoulder or collar and they are slipped upon the axle from each end thereof and are held against the shoulders or collars by nuts which screw upon threaded sections of the axle. These nuts may also have integral therewith or attached thereto dust caps, as will hereinafter be explained.

Figure 1:
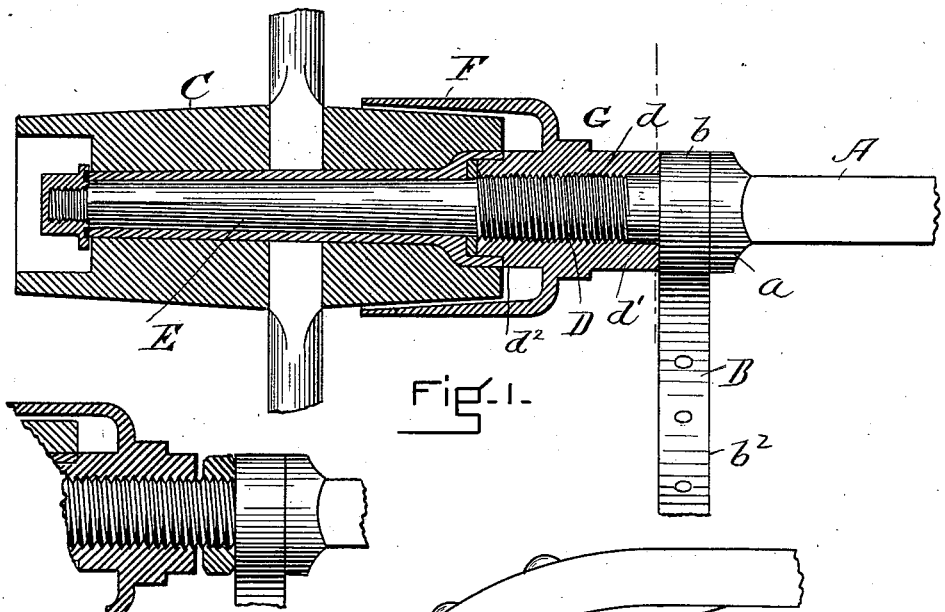
Figures 2, 5:
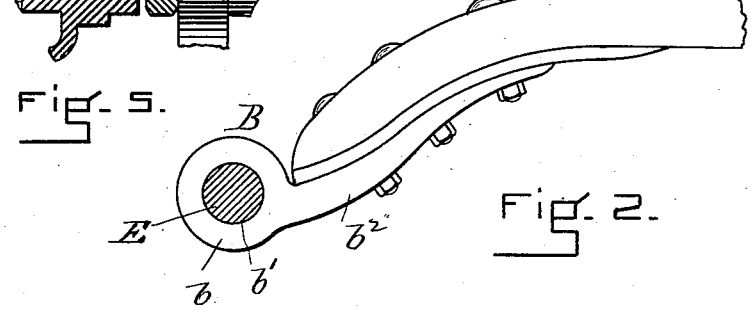
Figures 3, 4:
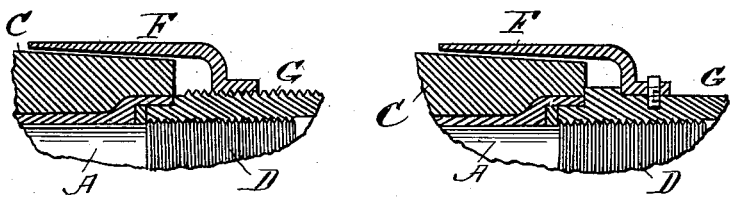

Referring to the drawings: Figure 1 is a view of one end of an axle representing my invention as applied thereto. Fig. 2 is a view in section upon the dotted line of Fig. 1 and of the parts to the right thereof. Figs. 3 and 4 are detail views to which reference is hereinafter made. Fig. 5 is a detail view representing the nut for holding the coupling against the collar as made separate from the dust cap nut.

In the drawings,—A is the axle.

B is the thill or shaft coupling, one only being shown.

C represents the wheel hub; D the threaded section of the axle, E the hub bearing, F the dust cap, and G the coupling holding nut.

The coupling B is shown in Fig. 2, and it has the cylindrical section $b$, in which is a hole $b'$ of the size of the axle next the collar $a$. It has also the arm $b^2$ which extends radially from the ring and in which are holes $b^3$ for receiving the bolts used in fastening it to the thill end.

The coupling is attached to the axle by entering it thereon from its end, and it is held against the collar $a$ by the nut G, the nut having an interior threaded section $d$ which engages with the threaded section D of the axle. A stop is formed at $d'$ to prevent the nut from being screwed tightly against the outer face of the coupling ring, as while it is desirable that it should be clamped between the nut and the collar firmly enough to prevent rattle it is not desirable to rigidly lock it thereto.

I have represented the coupling holding nut as carrying or supporting a dust cap which may or may not be integral with it, and as forming the inner shoulder against which the hub ring may bear, such bearing being established by outer end $d^2$ of the nut. The nut has any desired form of wrench receiving surface, and when the dust cap F is integral with it, I prefer the construction represented in Fig. 1. The dust cap, however, may be formed separately from the nut and attached to the nut by screwing thereon, as represented in Fig. 3, or by pinning or riveting, as represented in Fig. 4, or in any other desired way.

While I have called the part G a nut, it acts not only to hold the coupling upon the axle against the collar, but also as a spacing sleeve between the coupling and the inner end of the hub and also as a shoulder or collar against which the inner end of the hub may bear and the end of which may extend slightly within the hub, as represented in Fig. 1.

A coupling of this construction is very strong, very durable, easily attached to the axle, is safe, and does away with noise produced by the form of coupling now in vogue.

Having thus fully described my invention, I claim and desire to secure by Letters Patent of the United States—

1. The combination of a carriage or wagon axle having collars or shoulders $a$ and threaded sections D and a bearing section between the threaded sections and the collars, with the thill couplings B having holes to receive the axle ends as specified, and held against the collars or shoulders $a$ by nuts D, which screw upon the axle, as and for the purposes described.

2. The combination of the shaft A having the collars $a$, the threaded sections D and the hub bearings E, with the thill couplings B attached to the shaft as specified, and the combined spacing rings and nuts D, the nuts screwing upon the threaded sections of the axle, as and for the purposes described.

3. The combination of the axle A provided with the collars or shoulders $a$ and the threaded sections D with the holding nuts G having the shoulders or ends $d^2$ against which the inner ends of the hubs bear, substantially as described.

4. The combination of the axle A having the shoulders or collars $a$ and threaded sections D, the hub bearings E, the hubs C, and the dust caps F carried by the nuts G, as and for the purposes described.

GEORGE N. PEARSON.

In presence of—
J. A. SMITH,
G. W. C. DAVISON.